(12) United States Patent
Slassi et al.

(10) Patent No.: US 12,056,313 B2
(45) Date of Patent: Aug. 6, 2024

(54) NOISE COMPENSATION USING A SPATIAL NOISE MODEL

(71) Applicant: Microsoft Technology Licensing, LLC, Redmond, WA (US)

(72) Inventors: Matan Slassi, Herzelyia (IL); Lior Zagiel, Tel-Aviv (IL); Nadav Linenberg, Even Yehuda (IL); Assaf Cohen, Modiin (IL); Arie Yehuda Gur, Kiryat Ono (IL); Netanel Hadad, Lod (IL); Tal Aviv, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/807,022

(22) Filed: Jun. 15, 2022

(65) Prior Publication Data

US 2023/0409144 A1     Dec. 21, 2023

(51) Int. Cl.
*G06F 3/044*     (2006.01)
*G06F 3/0354*    (2013.01)
*G06F 3/041*     (2006.01)

(52) U.S. Cl.
CPC ...... *G06F 3/04186* (2019.05); *G06F 3/03545* (2013.01); *G06F 3/0412* (2013.01); *G06F 3/0441* (2019.05); *G06F 3/0442* (2019.05)

(58) Field of Classification Search
CPC ........ G06F 3/02; G06F 3/0442; G06F 3/0446; G06F 3/041; G06F 3/046; G06F 3/044
See application file for complete search history.

(56) References Cited

U.S. PATENT DOCUMENTS

| | | | | |
|---|---|---|---|---|
| 4,293,734 A * | 10/1981 | Pepper, Jr. | .............. | G06F 3/045 |
| | | | | 984/316 |
| 7,372,455 B2 * | 5/2008 | Perski | .................. | G06F 3/0488 |
| | | | | 345/173 |
| 7,649,524 B2 * | 1/2010 | Haim | ................ | G06F 3/041661 |
| | | | | 345/173 |
| 9,524,045 B2 * | 12/2016 | Zachut | ................ | G06F 3/04162 |
| 9,823,774 B2 * | 11/2017 | Winebrand | ........... | G06F 1/1626 |
| 10,067,575 B2 | 9/2018 | Agarwal et al. | | |
| 10,126,874 B2 | 11/2018 | Hargreaves et al. | | |
| 10,437,115 B2 * | 10/2019 | Kimura | ............. | G02F 1/133345 |
| 10,452,221 B2 * | 10/2019 | Kimura | ............... | G06F 3/04166 |
| 10,845,901 B2 * | 11/2020 | Shahparnia | ............. | G06F 3/041 |
| 2007/0291831 A1* | 12/2007 | Lee | ......................... | H01Q 9/30 |
| | | | | 375/227 |
| 2015/0035768 A1* | 2/2015 | Shahparnia | ........... | G06F 3/0442 |
| | | | | 345/173 |
| 2015/0035769 A1* | 2/2015 | Shahparnia | ....... | G06F 3/041661 |
| | | | | 345/173 |
| 2017/0242520 A1* | 8/2017 | Winebrand | ............... | G06F 3/16 |
| 2018/0067366 A1* | 3/2018 | Kimura | ............... | G02F 1/13439 |

(Continued)

*Primary Examiner* — Olga V Merkoulova
(74) *Attorney, Agent, or Firm* — Alleman Hall & Tuttle LLP

(57) ABSTRACT

Examples are disclosed relating to using a spatial noise model to compensate for noise in a frame of touch sensor data. One example provides, on a computing device, a method comprising receiving a noise level for each sensor antenna of a set of sensor antennas of a touch sensor; for each pair of sensor antennas, determining a noise compensation ratio comprising a noise level of a first antenna compared to a noise level of a second antenna; and storing the noise compensation ratio in a spatial noise model.

15 Claims, 8 Drawing Sheets

(56) References Cited

U.S. PATENT DOCUMENTS

| | | |
|---|---|---|
| 2018/0067592 A1* | 3/2018 | Kimura .................. G06F 3/047 |
| 2020/0203641 A1* | 6/2020 | Lee ..................... H01L 51/5237 |
| 2021/0026514 A1 | 1/2021 | Lee et al. |
| 2021/0096723 A1 | 4/2021 | Morin et al. |
| 2022/0029138 A1 | 1/2022 | Wang et al. |
| 2022/0043531 A1* | 2/2022 | Tang ..................... G06F 3/0418 |
| 2022/0057912 A1 | 2/2022 | Yang et al. |

\* cited by examiner

NOISE COMPENSATION USING A SPATIAL NOISE MODEL

BACKGROUND

Computing devices, such as laptop computers, tablet computers, and smart phones, may be configured to receive stylus inputs via a touch-sensitive display. Such devices may use a capacitive touch sensor system to receive inputs from and communicate with the stylus. In some computing devices, a touch sensor and display may be partially integrated with one another. For example, in an OLED (organic light emitting diode) display device, structures of a touch sensor may be formed on an encapsulant layer of an OLED display panel of the device. This may help to reduce device thickness compared to the use of separate touch sensing and display structures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to using a spatial noise model to compensate for noise in a frame of touch sensor data. One example provides, on a computing device comprising a display and a touch sensor, a method comprising receiving a noise level for each sensor antenna of a set of sensor antennas of the touch sensor, and for each pair of sensor antennas of the set of sensor antennas, determining a noise compensation ratio comprising a noise level of a first antenna of the pair of sensor antennas compared to a noise level of a second antenna of the pair of sensor antennas. The method further comprises for each pair of sensor antennas, storing the noise compensation ratio in a spatial noise model.

Another example provides a computing device comprising a display, a touch sensor, a logic machine, and a storage machine comprising instruction executable by the logic machine to determine a stylus location. The instructions are executable to determine the stylus location by, for a frame of touch sensor data, selecting a reference antenna, and compensating for noise in the frame of touch sensor data to form a reduced-noise frame of touch sensor data by, for each sensor antenna of a set of sensor antennas of the touch sensor, applying a noise compensation ratio representing a characterized noise level of the sensor antenna to a characterized noise level of the reference antenna.

DETAILED DESCRIPTION

Figure 1:
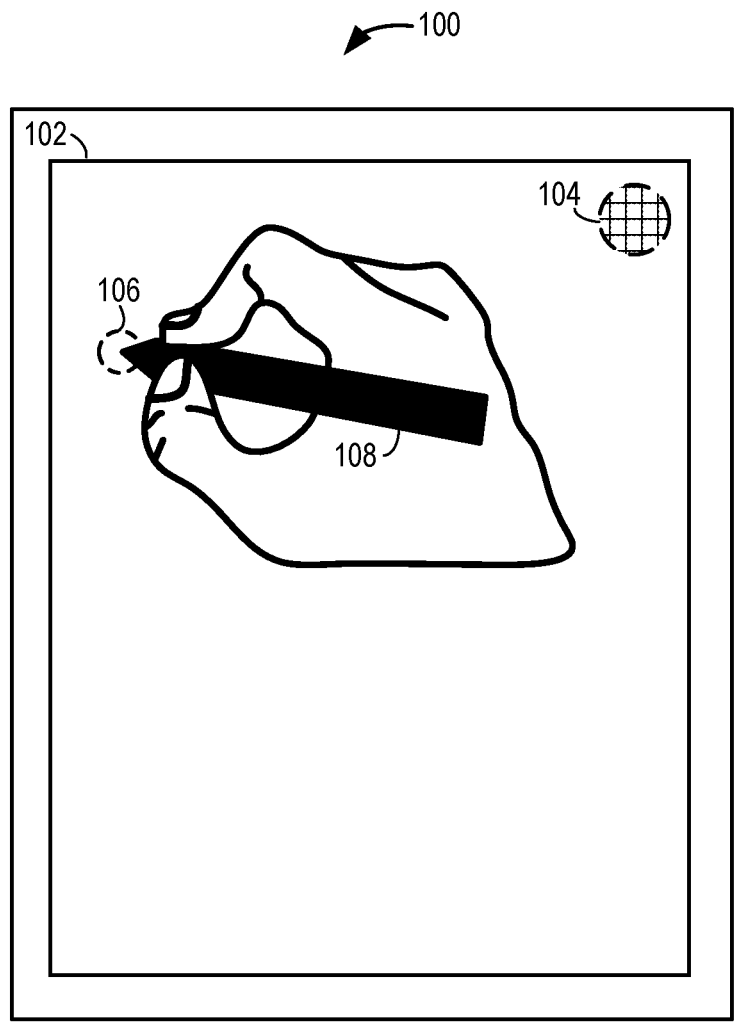
FIG. 1 shows an example computing device configured to utilize stylus input.

A touch on encapsulation (TOE) touch-sensitive display system comprises touch sensing electrodes formed on an encapsulant of an OLED display. The use of a TOE sensor may facilitate the design of a flexible display with a narrower bezel and/or a thinner touch-sensitive display stackup, and thus may help to reduce size of a computing device. However, signals from the OLED display may couple as noise onto sensor antennas of the TOE touch sensor. Further, an OLED stack-up comprising the TOE touch sensor may attenuate a received stylus signal more than other touch sensor architectures. In some scenarios, the noise coupled onto the TOE touch sensor may be on the same order of magnitude as the received stylus signal. High noise situations may pose difficulties in finding a stylus signal in touch sensor data.

One possible solution for compensating for OLED display noise on a TOE touch sensor is to use a noise measurement on a reference antenna as an estimate of noise on other antennas. The reference antenna may comprise, for example, an antenna that is spaced sufficiently far from a determined touch input location in a frame of touch sensor data. However, noise may not be distributed uniformly across the sensor antennas of the touch sensor, due for example to an uneven grounding layer generated by a cathode of the OLED display. Thus, the noise measured on the reference antenna may not be a suitable estimate of noise on other antennas to use for noise reduction.

Accordingly, examples are disclosed that relate to using a spatial noise model to compensate for noise in a frame of touch sensor data. Briefly a reference antenna is selected for a frame of touch sensor data. The reference antenna is then used to compensate for noise in the frame of touch sensor data by, for each sensor antenna of a set of sensor antennas of the touch sensor, applying a noise compensation ratio. The noise compensation ratio represents a characterized noise level of the sensor antenna to a characterized noise level of the reference antenna. The noise compensation ratio is determined and stored for each antenna pair of the set of sensor antennas in a spatial noise model at a time when no stylus touch is being received by the touch sensor. Thus, the spatial noise model comprises information on the distribution of noise across the TOE sensor. In such a manner, the noise compensation ratios and the spatial noise model may help to compensate for a non-uniform distribution of noise on the TOE sensor. After performing noise compensation using the spatial noise model, a stylus location is determined in the reduced-noise frame of touch sensor data. In some examples, additional noise compensation is applied to the reduced-noise frame of touch sensor data for a subset of sensor antennas of the touch sensor that are proximate to the touch input. In some such examples, the determined stylus location may be adjusted after applying additional noise compensation to the subset of antennas. While discussed herein in the context of a TOE sensor, a spatial noise model may be used with any other suitable type of sensor with which non-uniform noise distribution can be seen.

FIG. 1 shows an example computing device 100 configured to utilize stylus input. Computing device 100 may represent any suitable type of mobile computing device. Examples include smart phones, tables, and laptop computers. Computing device 100 comprises a display 102 and a touch sensor 104. In some examples, display 102 may comprise an OLED display. In some such examples, touch sensor 104 may comprise a TOE touch sensor. In other examples, computing device 100 may comprise any other suitable display and/or touch sensor.

Computing device 100 is configured to determine a stylus location 106 at which a stylus 108 touches display 102. As described in more detail below, to determine a stylus location, for a frame of touch sensor data, computing device 100 selects a reference antenna. The reference antenna can comprise a determined untouched antenna or a determined probable untouched antenna so that the signal from the reference antenna is unlikely to include any contribution from touch. Noise compensation is performed on the frame of touch sensor data to form a reduced-noise frame of touch sensor data by applying, for each antenna signal, a noise compensation ratio stored in a spatial noise model. The noise compensation ratio represents, for each sensor antenna of touch sensor 104, a characterized noise level of the sensor antenna compared to a characterized noise level of the reference antenna.

In some examples, computing device 100 performs additional noise compensation in the reduced-noise frame of touch sensor data for a subset of sensor antennas of touch sensor 104 within a range of stylus location 106. The stylus location then may be adjusted after performing the addition noise compensation Such a configuration may help to determine a touch location of stylus 108 more accurately than where an additional noise compensation process is omitted. In some examples, stylus 108 comprises an active stylus configured to transmit a stylus touch signal, which may comprise one or more frequency bands. Such a configuration may help to enable data communication between stylus 108 and computing device 100. In other examples, stylus 108 may comprise a any other suitable type of stylus.

Figure 2:
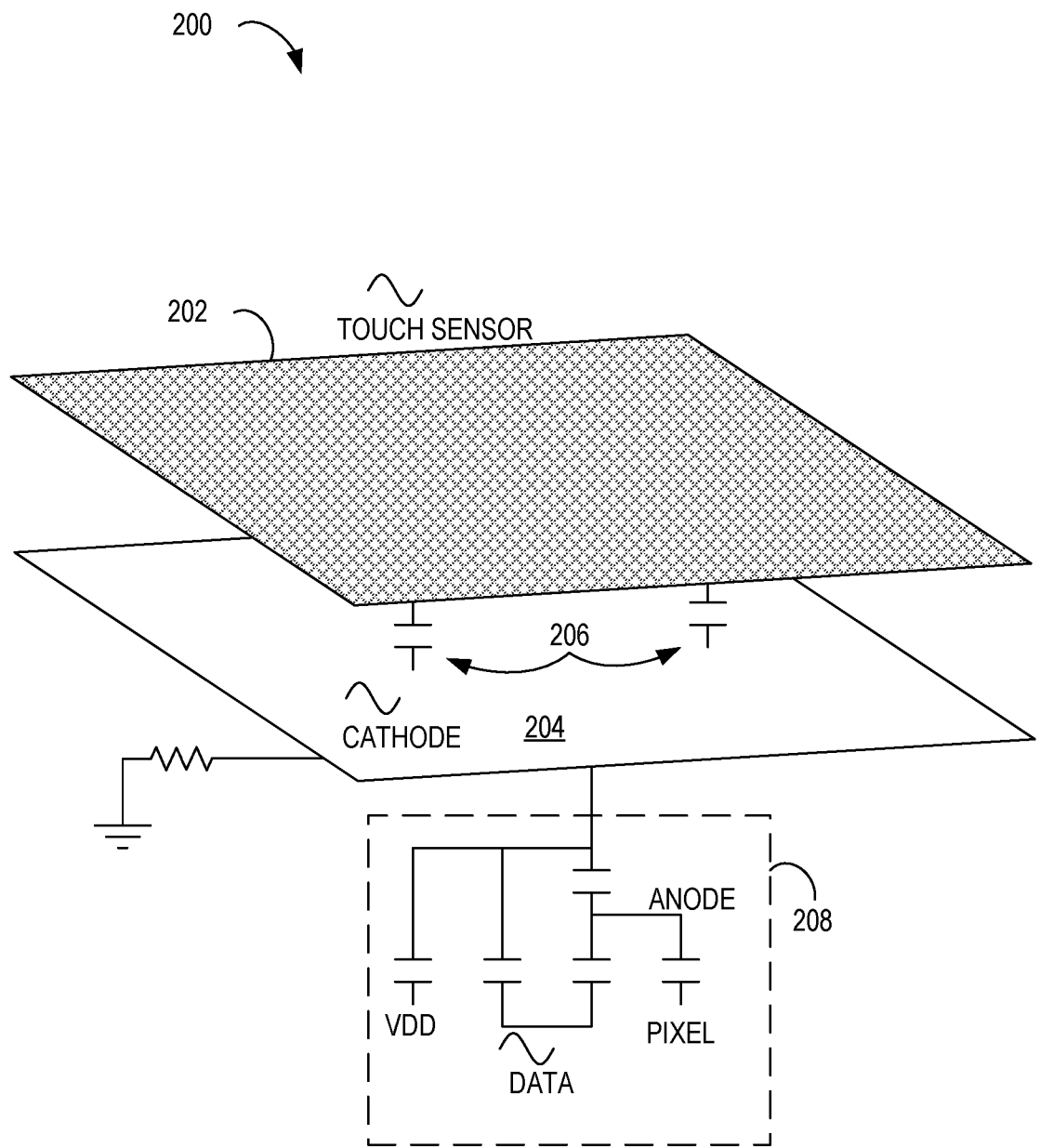
FIG. 2 schematically shows an example touch on encapsulation (TOE) OLED display, and illustrates noise coupling between a cathode layer and a touch sensor.

As mentioned above, noise coupled onto a touch sensor from a display may interfere with determining a stylus location. FIG. 2 shows a schematic view of noise coupling in an example OLED display 200. OLED display 200 is an example of display 102. OLED display 200 comprises a TOE touch sensor 202 and a cathode layer 204. OLED display 200 further comprises an anode layer, a pixel circuit, a power supply (VDD), and OLED data, schematically illustrated at 208. Signals from cathode layer 204 may couple onto TOE touch sensor 202, as indicated schematically by capacitors 206. Due to the proximity of TOE touch sensor 202 to cathode layer 204, noise coupled onto TOE touch sensor 202 may be of a relatively high magnitude compared to a stylus signal in touch sensor data.

Further, the noise coupled onto TOE touch sensor 202 may not be uniformly distributed across OLED display 200. In some examples, an uneven grounding layer generated by cathode layer 204 may result in a spatially nonuniform coupling of the noise. FIG. 2 is illustrative of the noise coupling between TOE touch sensor 202 and cathode layer 204. In other examples, other noise coupling between an OLED display and a touch sensor may occur.

Figure 3:
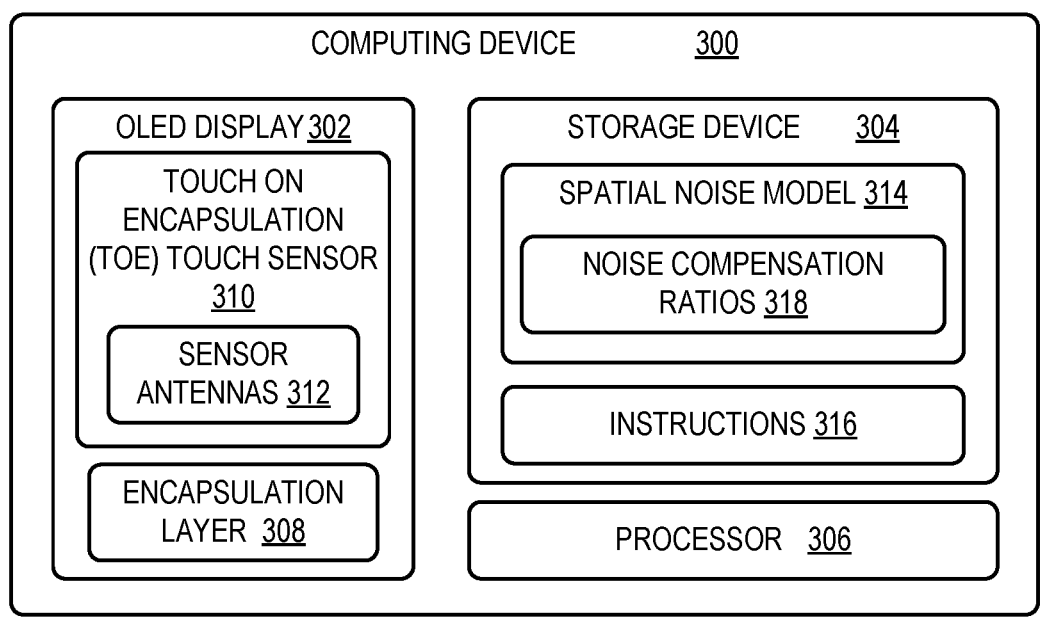
FIG. 3 shows a block diagram of an example mobile computing device.

As previously mentioned, such noise may impact locating a stylus signal in touch sensor data. FIG. 3 shows a block diagram of an example computing device 300 comprising a spatial noise model to compensate for such noise. Computing device 100 is an example of computing device 300. Computing device 300 comprises an OLED display 302, a storage device 304, and a processor 306. OLED display 302 comprises an encapsulation layer 308 and a TOE touch sensor 310 disposed on encapsulation layer 308. As previously mentioned, such a configuration may allow for smaller computing devices than other touch sensor architectures for otherwise similar devices. In other examples, any other suitable touch sensor architecture may be used in computing device 300.

TOE touch sensor 310 comprises an array of sensor antenna(s) 312. As mentioned above, each sensor antenna 312 may have a different noise level, such as a different amount of coupled noise. Thus, computing device 300 comprises a spatial noise model 314 to allow for noise correction where a noise level is not consistent across the array of sensor antennas 312. Storage device 304 further comprise instructions 316 executable by processor 306 to determine spatial noise model 314 by a calibration process, and compensate for noise in a frame of touch sensor data using spatial noise model 314. Spatial noise model 314 comprises a plurality of noise compensation ratios 318, discussed in more detail below.

Figure 4:
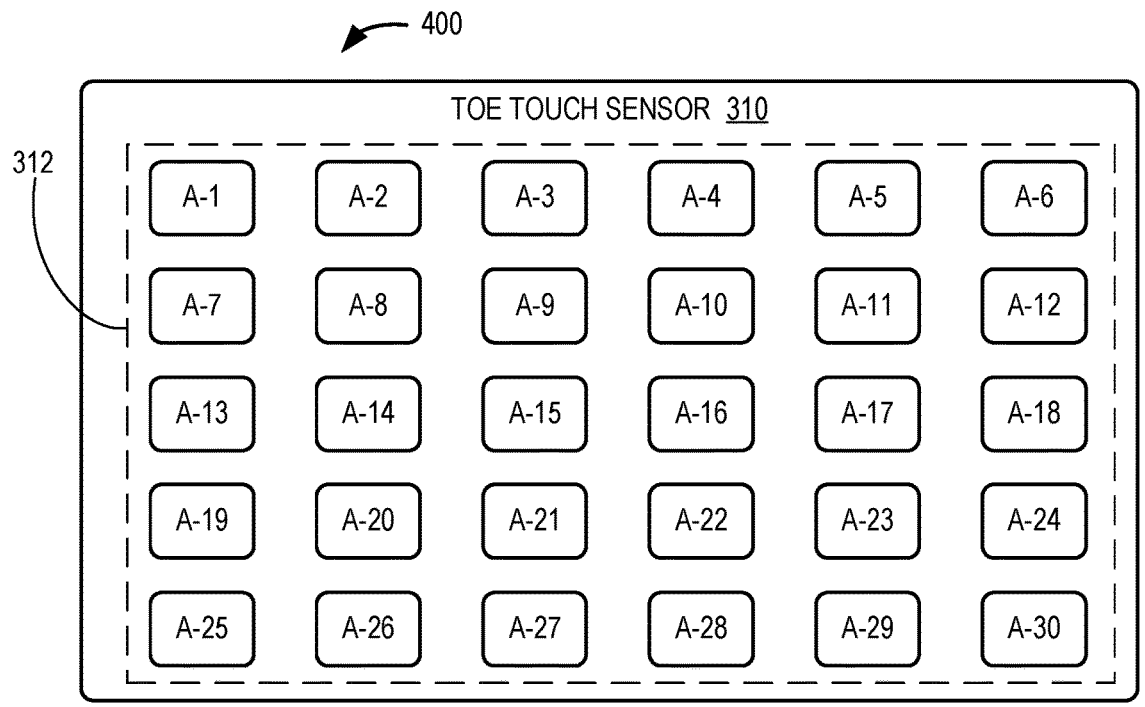
FIG. 4 shows an example layout of sensor antennas of a touch sensor of FIG. 3.

FIG. 4 schematically depicts an example layout 400 of sensor antennas of TOE touch sensor 310. Layout 400 shows sensor antennas 312 labeled in ascending numerical order. The depicted number and layout of antennas is illustrative, and any suitable number of sensor antennas and/or layout of sensor antennas may be used.

As previously mentioned, noise coupled onto each sensor antenna 312 may not be uniform. As a specific example, sensor antenna A-2 may have a different noise level than sensor antenna A-3 and/or sensor antenna A-22. Thus, relative levels of noise across layout 400 may be characterized by a noise compensation ratio for each antenna pair of a plurality of antennas of layout 400. Then, the noise characterization ratios that compare an antenna selected for use as a reference antenna with other antennas may be used for noise compensation.

Figure 5:
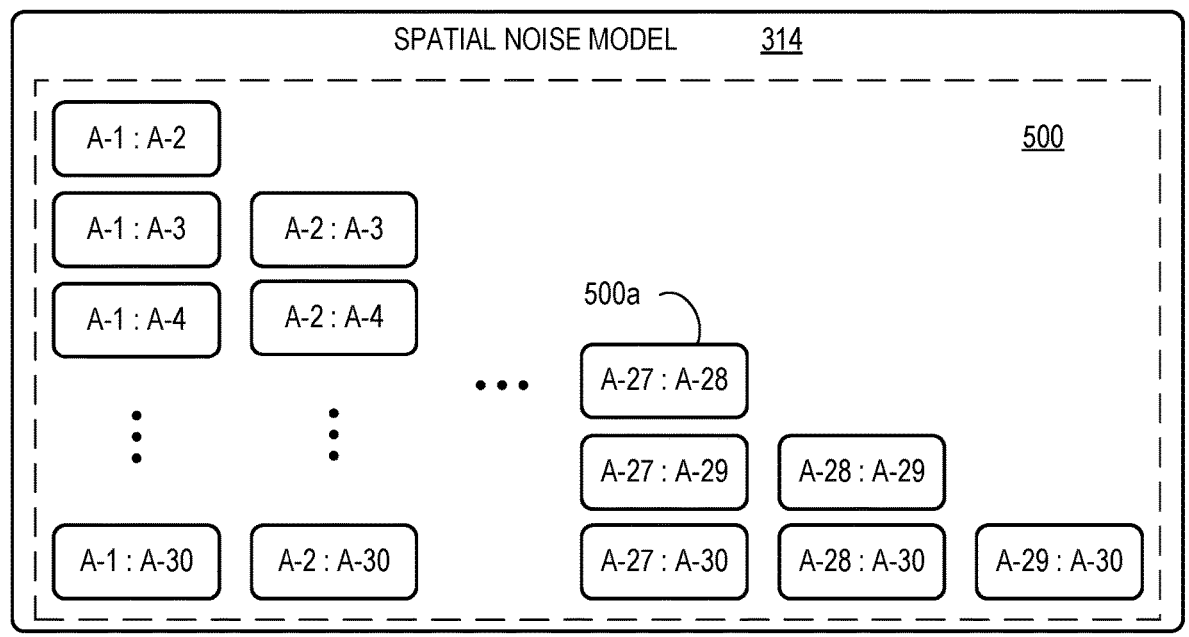
FIG. 5 shows a block diagram of an example spatial noise model for the sensor antennas of FIG. 4.

FIG. 5 shows a block diagram illustrating example noise compensation ratios 500 for the sensor antennas of FIG. 4. Each noise compensation ratio 500 comprises a characterized noise level of one antenna compared to a characterized noise level of another antenna. As a specific example, noise compensation ratio 500a comprises a characterized noise level of sensor antenna "A-27" compared to a characterized noise level of sensor "A-28."

Noise compensation ratios 500 can be determined as part of a factory setting in a calibration process, and/or determined during computing device use. Further, in some examples, noise compensation ratios 500 can be updated during device use. Updating of noise compensation ratios may be triggered by any suitable event. In some examples, updating of noise compensation ratios of a spatial noise model may be triggered according to a predetermined schedule. In other examples, a sensed condition may be used to trigger updating of a spatial noise model, such as a change in temperature (e.g., that exceeds a threshold magnitude, or that passes a threshold temperature value), and/or a threshold shock as measured via an IMU (e.g., when a device is dropped). Spatial noise model 314 comprises noise compensation ratios 500 for all antenna pairs of layout 400. In other examples, a spatial noise model may comprise noise compensation ratios for a subset of sensor antennas of a touch sensor.

Figure 6:
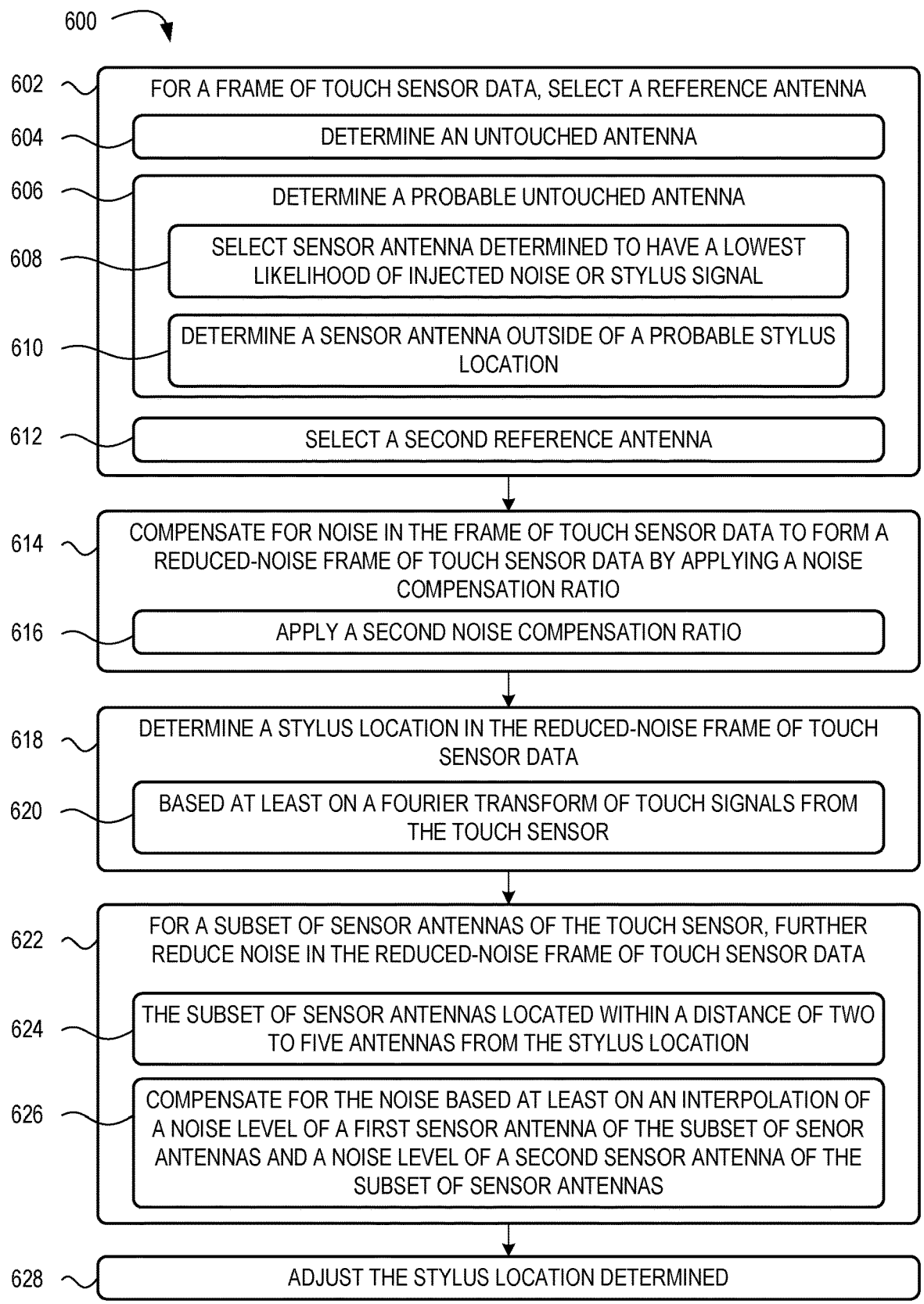
FIG. 6 shows a flow diagram of an example method for determining a stylus location on a touch-sensitive display device.

FIG. 6 shows a flow diagram depicting an example method 600 for determining a stylus location. Method 600 may be performed on a computing device comprising a display and a touch sensor, such as computing device 100 or computing device 300. In some examples, the computing device may comprise a TOE OLED display device. In other examples, the computing device may comprise any other suitable touch sensing and display architecture.

Method 600 comprises, at 602, for a frame of touch sensor data, selecting a reference antenna. Selecting a reference antenna may comprise, at 604, determining an untouched antenna. The untouched antenna may be determined in any suitable manner, including methods currently used for locating reference antennas for noise compensation.

In situations where noise levels are high, it may be difficult to select an untouched antenna with sufficiently high certainty. Thus, in such examples, selecting a reference antenna may comprise, at 606, determining a probable untouched antenna. The term "probable untouched antenna" refers to an antenna of the touch sensor that appears not to be touched based upon one or more signals from the antenna, but for which a noise level makes the determination uncertain. In some examples, determining the probable untouched antenna may comprise, at 608, selecting a sensor antenna determined to have a lowest likelihood of containing a stylus signal and/or injected noise. Further, in some examples, determining the probable untouched antenna may comprise, at 610, determining the probable untouched antenna by determining a sensor antenna outside of a probable stylus location. For example, the probable stylus location may be based on a stylus location from a prior frame of touch sensor data. In other examples, any other suitable method may be used to determine a probable untouched antenna.

In some examples, one or more additional reference antenna may be selected to help provide more information regarding the noise in the frame of touch sensor data. For example, an average noise based at least on the noise levels of the selected reference antennas may be used for noise compensation. Thus, method 600 comprises, at 612, for the frame of touch sensor data, selecting a second reference antenna for additional noise compensation. In other examples, three or more reference antennas may be selected.

Continuing, method 600 comprises, at 614, compensating for noise in the frame of touch sensor data to form a reduced-noise frame of touch sensor data by, for each sensor antenna of a set of sensor antennas of the touch sensor, applying a noise compensation ratio representing a characterized noise level of the sensor antenna compared to a characterized noise level of the reference antenna. The noise compensation ratio may be retrieved from a spatial noise model. In examples where a second reference antenna is selected, method 600 comprises, at 616, for each sensor antenna of the set of sensor antennas of the touch sensor, applying a second noise compensation ratio representing the characterized noise level of the sensor antenna to a characterized noise level of the second reference antenna. Applying the second noise compensation ratio may further help to decrease a level of noise in the frame of touch sensor data.

Method 600 further comprises, at 618, determining a stylus location in the reduced-noise frame of touch sensor data. In some examples, determining the stylus location may be based at least on a Fourier transform of touch signals from the touch sensor, as indicated at 620. Performing a Fourier transform may allow stylus communication signals at particular frequencies to be detected at one or more antennas near the stylus location. In other examples, the stylus location may be determined in any other suitable manner.

In some examples, once a stylus location has been determined, additional noise compensation may be performed for antennal signals in the vicinity of the stylus touch and/or to increase an accuracy of the stylus location. As such, method 600 may comprise, at 622, for a subset of sensor antennas of the touch sensor, further reducing the noise in the reduced-noise frame of touch sensor data by compensating for the noise based at least on a noise level of a first sensor antenna of the subset of sensor antennas and a noise level of a second sensor antenna of the subset of sensor antennas. The subset of sensor antennas of the touch sensor is located within a range of the stylus location. For example, the subset of sensor antennas of the touch sensor may comprise sensor antennas located within a distance of two to five antennas from the stylus location, as indicated at 624. In other examples, any other suitable subset of antennas may be used.

In some examples, further reducing the noise in the reduced-noise frame of touch sensor data comprises compensating for the noise based at least on an interpolation of the noise level of the first sensor antenna of the subset of sensor antennas and the noise level of the second sensor antenna of the subset of sensor antennas, as indicated at 626. In such a manner, the noise may be further reduced in the reduced-noise frame of touch sensor data for the subset of sensor antennas located within the range of the stylus location. Method 600 further may comprise, at 628, adjusting the stylus location determined based at least on the reduced noise in the subset of sensor antennas. Adjusting the stylus location determined based upon the additional noise compensation may help to further reduce the noise in the subset of sensor antennas and increase an accuracy of the stylus location determined.

Figure 7:
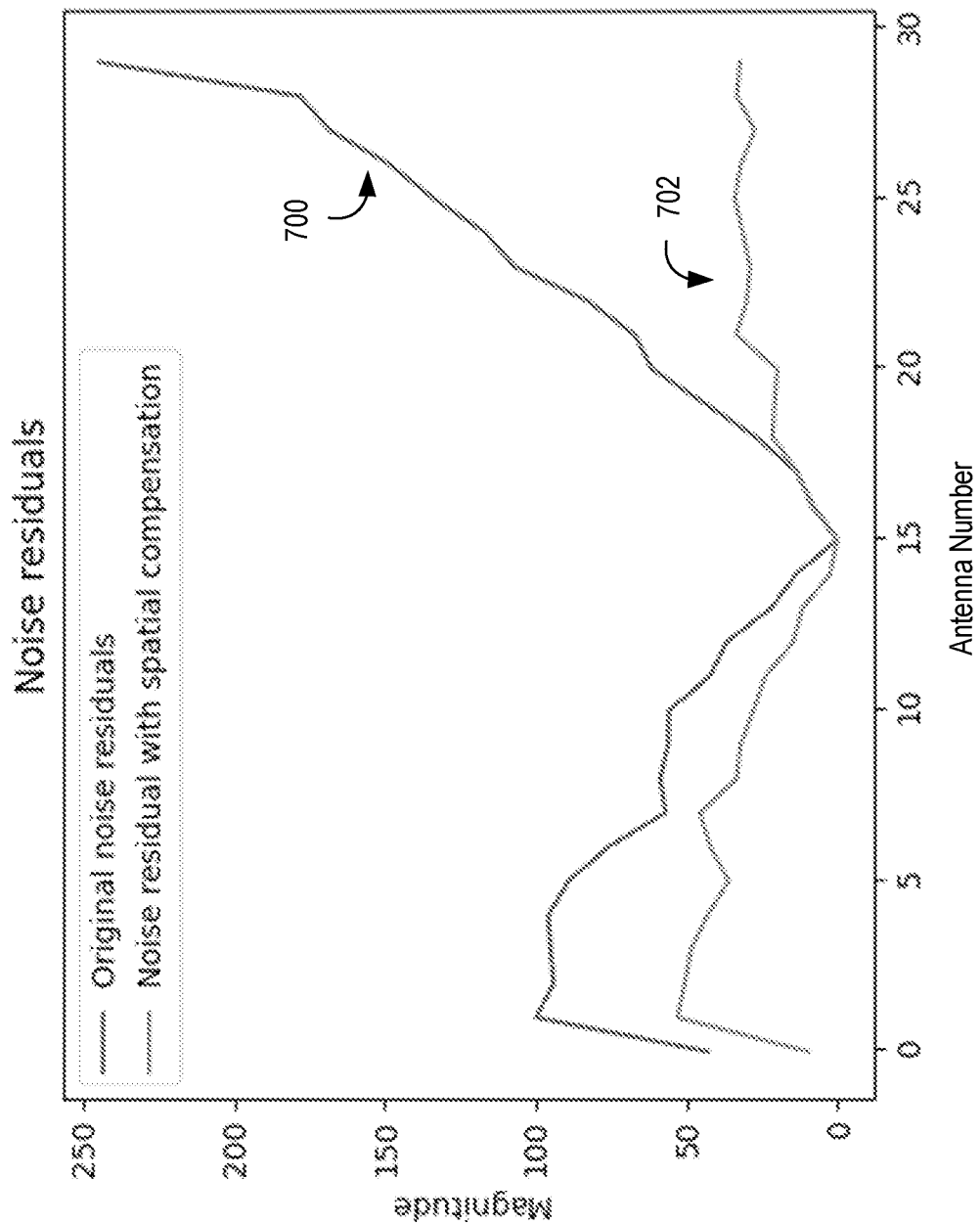
FIG. 7 shows plots of calculated residual noise levels for an example noise reduction method using a spatial noise model compared to a similar method that omits the use of a spatial noise model.

FIG. 7 depicts an example plot of calculated residual noise magnitude versus antenna location. In the depicted example, the antenna number indicates a spatial order of antennas, such that adjacently numbered antennas are located more closely together than antennas with larger separations in number. The order of antenna numbers of FIG. 7 is not related to layout 400 of FIG. 4. Plot 700 shows a residual noise level after compensating for noise in a frame of touch sensor data utilizing a reference antenna and a noise model in which a common noise level is assumed for all sensor antennas of the touch sensor. In the depicted example, the reference antenna is antenna number 15. Plot 702 shows a residual noise level after compensating for noise using an example spatial noise model according to the present disclosure. As can be seen by comparing plot 700 and plot 702, the residual noise level may be decreased by up to five times using the spatial noise model compared to using the common noise model.

Figure 8:
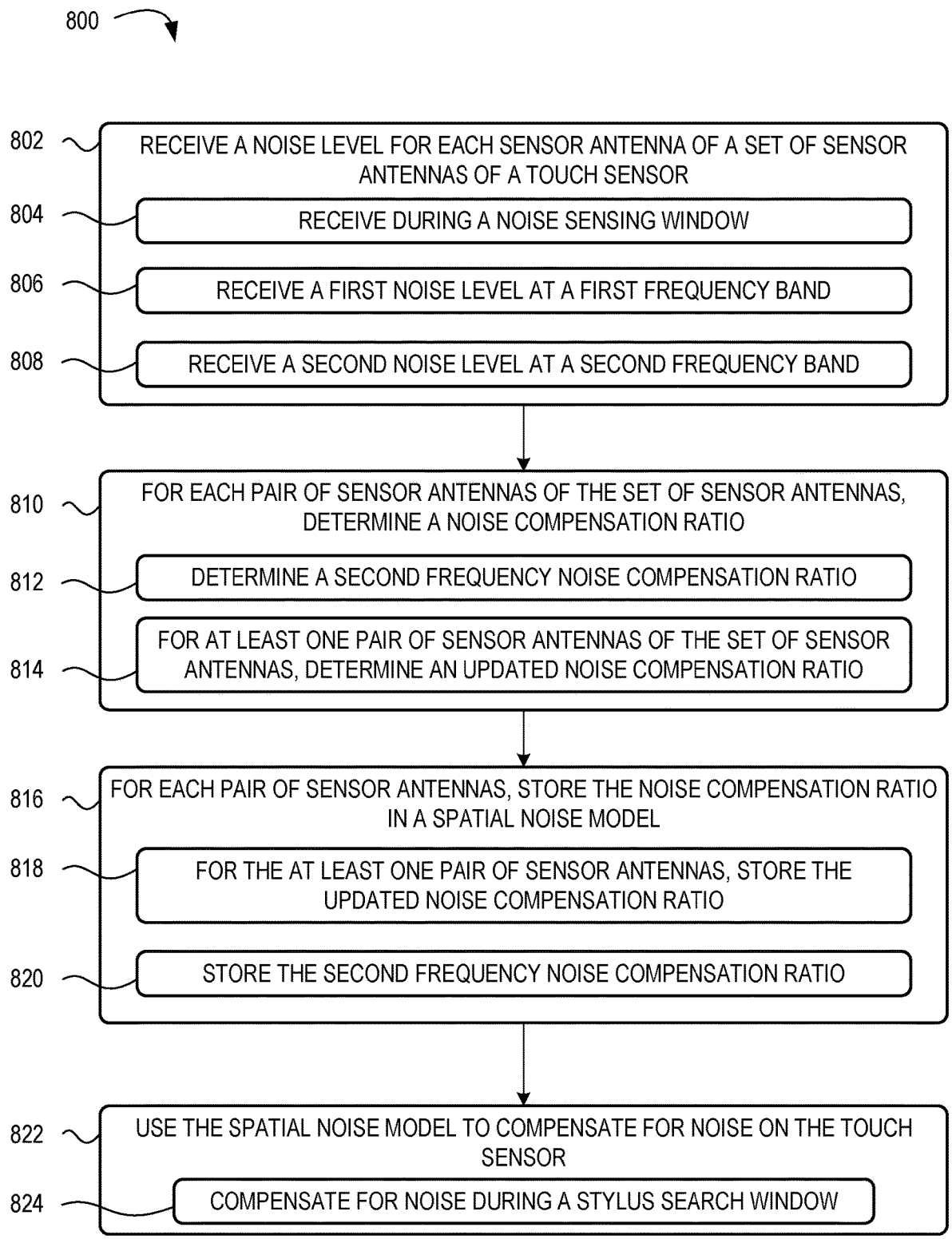
FIG. 8 shows a flow diagram of an example method for determining a spatial noise model.

FIG. 8 illustrates a flow diagram of an example method 800 for determining a spatial noise model. Method 800 may be performed on a computing device comprising a display and a touch sensor, such as computing device 100 and computing device 300. Method 800 comprises, at 802, receiving a noise level for each sensor antenna of a set of sensor antennas of the touch sensor. In some examples, the set of sensor antennas may be a subset of sensor antennas of the touch sensor. In other examples, the set of sensor antennas may comprise all touch sensing sensor antennas of the touch sensor. In some examples, the touch sensor comprises a TOE touch sensor. The noise levels may be sensed at any suitable time. In some examples, the noise levels for the sensor antennas may be sensed when it is determined that the touch sensor is not being touched (e.g. in a factory calibration process). In other examples, the computing device may operate the touch sensor using different sensing windows, including a touch sensing window, a stylus search window, and a noise sensing window. In such examples, at 804, the noise level for each sensor antenna of the set of sensor antennas of the touch sensor may be received during the noise sensing window. In some examples, a noise sensing window may comprise a window of time during which the touch sensor is sensing frequency band(s) of the stylus, but the stylus is not transmitting data. As such, the touch sensor is sensing noise at the frequency band(s). Further, in some examples, the stylus search window may comprise a window of time in which the touch sensor is sensing stylus data, and the touch sensing window may comprise a window of time in which the touch sensor is sensing touch.

As previously mentioned, in some examples, a computing device may be configured to communicate with a stylus using signals within one or more frequency bands. In examples where plural frequency bands are used by a stylus, the noise level may be different at the different frequency bands. Thus, in such examples, method 800 may comprise receiving, at 806, a first noise level for each sensor antenna of the set of sensor antennas of the touch sensor at a first frequency band, and receiving, at 808, a second noise level for each sensor antenna of the set of sensor antennas of the touch sensor at a second frequency band. Such a configuration may help to compensate for noise across multiple frequency bands. In other such examples, any suitable number of noise levels may be determined at any suitable number of frequency bands.

Continuing, method 800 comprises, at 810, for each pair of sensor antennas of the set of sensor antennas, determining a noise compensation ratio comprising a noise level of a first antenna of the pair of sensor antennas compared to a noise level of a second antenna of the pair of sensor antennas. Where noise is sensed at multiple frequencies bands, the noise compensation ratios may be determined for each frequency band. As such, method 800 may comprise, at 812, for each pair of sensor antennas of the set of sensor antennas, determining a second frequency noise compensation ratio comprising a second noise level of the first antenna of the pair of sensor antennas compared to a second noise level of the second antenna of the pair of sensor antennas.

In some examples, the noise compensation ratios may be determined as a factory calibration process. Alternatively or additionally, the noise compensation ratios may be determined during device use. In such examples, one or more of the noise compensation ratios may be updated during device use. As such, method 800 may comprise, at 814, for at least one pair of sensor antennas of the set of sensor antennas, determining an updated noise compensation ratio. In this manner, the updated noise compensation ratio may reflect a change in noise levels in the touch sensor. This may help to maintain noise compensation performance over time, for example, when the device is exposed to conditions that may change noise characteristics (e.g., temperature change, shock, and/or ageing).

Method 800 further comprises, at 816, storing each noise compensation ratio in a spatial noise model. In examples where the updated noise compensation ratio is determined, method 800 comprises, at 818, for the at least one pair of sensor antennas, storing the updated noise compensation ratio in the spatial noise model. In such a manner, the spatial noise model may be updated and may reflect changes in the noise levels. Further, in examples where the second frequency noise compensation ratio is determined, method 800 comprises, at 820, for each pair of sensor antennas, storing the second frequency noise compensation ratio in the spatial noise model.

The computing system then may use the spatial noise model to compensate for noise on the touch sensor when determining a stylus location and/or for compensating a stylus touch signal for noise, as indicated at 822. In some examples, using the spatial noise model for compensating the stylus touch signal for noise may comprise compensating the stylus touch signal for the noise during a stylus search window, as indicated at 824.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
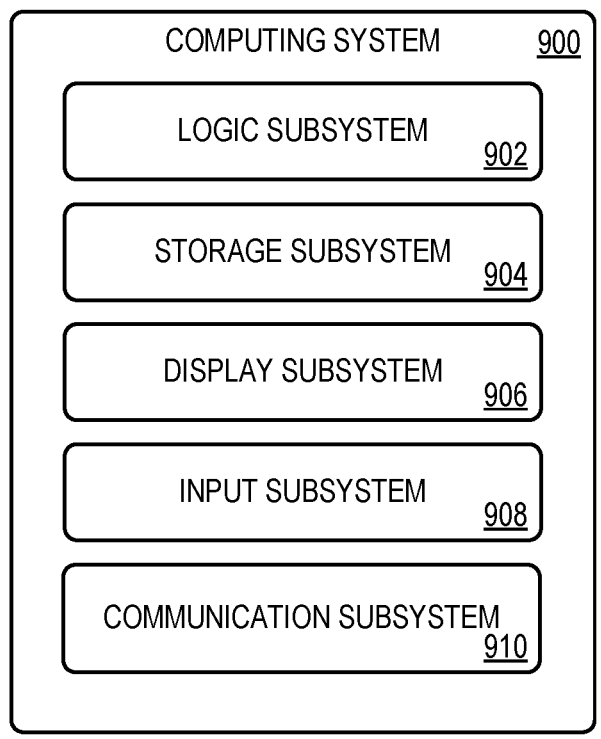
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. Computing device 100 and computing device 300 are examples of computing system 900.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic subsystem 902 executing instructions held by storage subsystem 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides, on a computing device comprising a display and a touch sensor, a method comprising, receiving a noise level for each sensor antenna of a set of sensor antennas of the touch sensor, for each pair of sensor antennas of the set of sensor antennas, determining a noise compensation ratio comprising a noise level of a first antenna of the pair of sensor antennas compared to a noise level of a second antenna of the pair of sensor antennas, and for each pair of sensor antennas, storing the noise compensation ratio in a spatial noise model. In some such examples, the method alternatively or additionally comprises using the spatial noise model for compensating a stylus touch signal for noise. In some such examples receiving the noise level for each sensor antenna of the set of sensor antennas of the touch sensor alternatively or additionally comprises receiving the noise level for each sensor antenna of the set of sensor antennas of the touch sensor during a noise sensing window, and using the spatial noise model for compensating the stylus touch signal for the noise alternatively or additionally comprises compensating the stylus touch signal for the noise during a stylus search window. In some such examples, the method alternatively or additionally comprises for at least one pair of sensor antennas of the set of sensor antennas, determining an updated noise compensation ratio, and for the at least one pair of sensor antennas, storing the updated noise compensation ratio in the spatial noise model. In some such examples, the noise compensation ratio is a first frequency noise compensation ratio, receiving the noise level for each sensor antenna of the set of sensor antennas of the touch sensor alternatively or additionally comprises receiving a first noise level for each sensor antenna of the set of sensor antennas of the touch sensor at a first frequency band, and the method alternatively or additionally comprises receiving a second noise level for each sensor antenna of the set of sensor antennas of the touch sensor at a second frequency band, for each pair of sensor antennas of the set of sensor antennas, determining a second frequency noise compensation ratio comprising a second noise level of the first antenna of the pair of sensor antennas compared to a second noise level of the second antenna of the pair of sensor antennas, and for each pair of sensor antennas, storing the second frequency noise compensation ratio in the spatial noise model.

Another example provides a computing device comprising, a display, a touch sensor, a logic machine, and a storage machine comprising instructions executable by the logic machine to determine a stylus location by for a frame of touch sensor data, select a reference antenna, and compensate for noise in the frame of touch sensor data to form a reduced-noise frame of touch sensor data by, for each sensor antenna of a set of sensor antennas of the touch sensor, applying a noise compensation ratio representing a characterized noise level of the sensor antenna to a characterized noise level of the reference antenna. In some such examples, the instructions executable to select the reference antenna alternatively or additionally comprise instructions executable to determine an untouched antenna. In some such examples, the instructions executable to select the reference antenna alternatively or additionally comprise instructions executable to determine a probable untouched antenna. In some such examples, the instructions are alternatively or additionally executable to determine the probable untouched antenna by selecting a sensor antenna determined to have a low likelihood of containing a stylus signal or injected noise. In some such examples, the instructions alternatively or additionally are executable to determine the probable untouched antenna by determining a sensor antenna outside of a probable stylus location. In some such examples, the instructions alternatively or additionally are further executable to, for the frame of touch sensor data, select a second reference antenna, and the instructions executable to compensate for the noise in the frame of touch sensor data are alternatively or additionally executable to compensate for the noise in the frame of touch sensor data by, for each sensor antenna of the set of sensor antennas of the touch sensor, applying a second noise compensation ratio representing the characterized noise level of the sensor antenna to a characterized noise level of the second reference antenna. In some such examples, the instructions are alternatively or additionally executable to determine the stylus location in the reduced-noise frame of touch sensor data. In some such examples, the instructions alternatively or additionally are executable to for a subset of sensor antennas of the touch sensor, further compensate for the noise based at least on a noise level of a first sensor antenna of the subset of sensor antennas and a noise level of a second sensor antenna of the subset of sensor antennas, the subset of sensor antennas of the touch sensor located within a range of the stylus location. In some such examples, the instructions alternatively or additionally are executable to adjust the stylus location based at least on reduced noise in the subset of sensor antennas. In some such examples, the touch sensor alternatively or additionally comprises a touch on encapsulation (TOE) touch sensor.

Another example provides, a computing device comprising, a display, a touch sensor, a logic machine, and a storage machine comprising instructions executable by the logic machine to for a frame of touch sensor data, select a reference antenna, compensate for noise in the frame of touch sensor data to form a reduced-noise frame of touch sensor data by, for each sensor antenna of a set of sensor antennas of the touch sensor, applying a noise compensation ratio representing a characterized noise level of the sensor antenna compared to a characterized noise level of the reference antenna, determine a stylus location in the reduced-noise frame of touch sensor data, for a subset of sensor antennas of the touch sensor, further reduce the noise in the reduced-noise frame of touch sensor data by compensating for the noise based at least on a noise level of a first sensor antenna of the subset of sensor antennas and a noise level of a second sensor antenna of the subset of sensor antennas, the subset of sensor antennas of the touch sensor located within a range of the stylus location, and adjust the stylus location determined based at least on the noise reduced in the subset of sensor antennas. In some such examples, within the range of the stylus location alternatively or additionally comprises a distance of two to five antennas from the stylus location. In some such examples, the instructions are alternatively or additionally executable to, for the subset of sensor antennas of the touch sensor, further reduce the noise in the reduced-noise frame of touch sensor data by compensating for the noise comprise instructions executable to compensate for the noise based at least on an interpolation of the noise level of the first sensor antenna of the subset of sensor antennas and the noise level of the second sensor antenna of the subset of sensor antennas. In some such examples, the instructions executable to determine the stylus location alternatively or additionally comprise instructions executable to determine the stylus location based at least on a Fourier transform of touch signals from the touch sensor. In some such examples, the touch sensor alternatively or additionally comprises a touch on encapsulation (TOE) touch sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a display;
   a touch sensor comprising an array of sensor antennas spatially distributed across the touch sensor;
   a logic machine; and
   a storage machine comprising a spatial noise model comprising a plurality of noise compensation ratios, each noise compensation ratio comprises a characterized noise level of one sensor antenna compared to a characterized noise level of another sensor antenna, and instructions executable by the logic machine to determine a stylus location by,
      for a frame of touch sensor data, select a reference antenna from the array of sensor antennas, and
      compensate for noise in the frame of touch sensor data to form a reduced-noise frame of touch sensor data by, for each sensor antenna of a set of sensor antennas of the array of sensor antennas, applying a noise compensation ratio, from the spatial noise model, representing a characterized noise level of the sensor antenna to a characterized noise level of the reference antenna.

2. The computing device of claim 1, wherein the instructions executable to select the reference antenna comprise instructions executable to determine an untouched antenna.

3. The computing device of claim 1, wherein the instructions executable to select the reference antenna comprise instructions executable to determine a probable untouched antenna.

4. The computing device of claim 3, wherein the instructions are executable to determine the probable untouched antenna by selecting a sensor antenna determined to have a low likelihood of containing a stylus signal or injected noise.

5. The computing device of claim 3, wherein the instructions are executable to determine the probable untouched antenna by determining a sensor antenna outside of a probable stylus location.

6. The computing device of claim 1, wherein
the instructions are further executable to, for the frame of touch sensor data, select a second reference antenna from the array of sensor antennas, and
wherein the instructions executable to compensate for the noise in the frame of touch sensor data are further executable to compensate for the noise in the frame of touch sensor data by, for each sensor antenna of the set of sensor antennas of the array of sensor antennas, applying a second noise compensation ratio, from the noise model, representing the characterized noise level of the sensor antenna to a characterized noise level of the second reference antenna.

7. The computing device of claim 1, wherein the instructions are further executable to determine the stylus location in the reduced-noise frame of touch sensor data.

8. The computing device of claim 7, further comprising instructions executable to
for a subset of sensor antennas of the array of sensor antennas, further compensate for the noise based at least on a noise level of a first sensor antenna of the subset of sensor antennas and a noise level of a second sensor antenna of the subset of sensor antennas, the subset of sensor antennas of the array of sensor antennas located within a range of the stylus location.

9. The computing device of claim 8, further comprising instructions executable to adjust the stylus location based at least on reduced noise in the subset of sensor antennas.

10. The computing device of claim 1, wherein the touch sensor comprises a touch on encapsulation (TOE) touch sensor.

11. A computing device comprising:
a display;
a touch sensor comprising an array of sensor antennas spatially distributed across the touch sensor;
a logic machine; and
a storage machine comprising a spatial noise model comprising a plurality of noise compensation ratios, each noise compensation ratio comprises a characterized noise level of one sensor antenna compared to a characterized noise level of another sensor antenna, and
instructions executable by the logic machine to
for a frame of touch sensor data, select a reference antenna from the array of sensor antennas,
compensate for noise in the frame of touch sensor data to form a reduced-noise frame of touch sensor data by, for each sensor antenna of a set of sensor antennas of the array of sensor antennas, applying a noise compensation ratio, from the spatial noise model, representing a characterized noise level of the sensor antenna compared to a characterized noise level of the reference antenna,
determine a stylus location in the reduced-noise frame of touch sensor data,
for a subset of sensor antennas of the array of sensor antennas, further reduce the noise in the reduced-noise frame of touch sensor data by compensating for the noise based at least on a noise level of a first sensor antenna of the subset of sensor antennas and a noise level of a second sensor antenna of the subset of sensor antennas, the subset of sensor antennas of the array of sensor antennas located within a range of the stylus location, and
adjust the stylus location determined based at least on the noise reduced in the subset of sensor antennas.

12. The computing device of claim 11, wherein within the range of the stylus location comprises a distance of two to five antennas from the stylus location.

13. The computing device of claim 11, wherein the instructions executable to, for the subset of sensor antennas of the array of sensor antennas, further reduce the noise in the reduced-noise frame of touch sensor data by compensating for the noise comprise instructions executable to compensate for the noise based at least on an interpolation of the noise level of the first sensor antenna of the subset of sensor antennas and the noise level of the second sensor antenna of the subset of sensor antennas.

14. The computing device of claim 11, wherein the instructions executable to determine the stylus location comprise instructions executable to determine the stylus location based at least on a Fourier transform of touch signals from the touch sensor.

15. The computing device of claim 11, wherein the touch sensor comprises a touch on encapsulation (TOE) touch sensor.

* * * * *